May 6, 1969     A. M. LAZAROS     3,442,603
METHOD AND APPARATUS FOR PURIFYING GASES
Filed Oct. 13, 1965
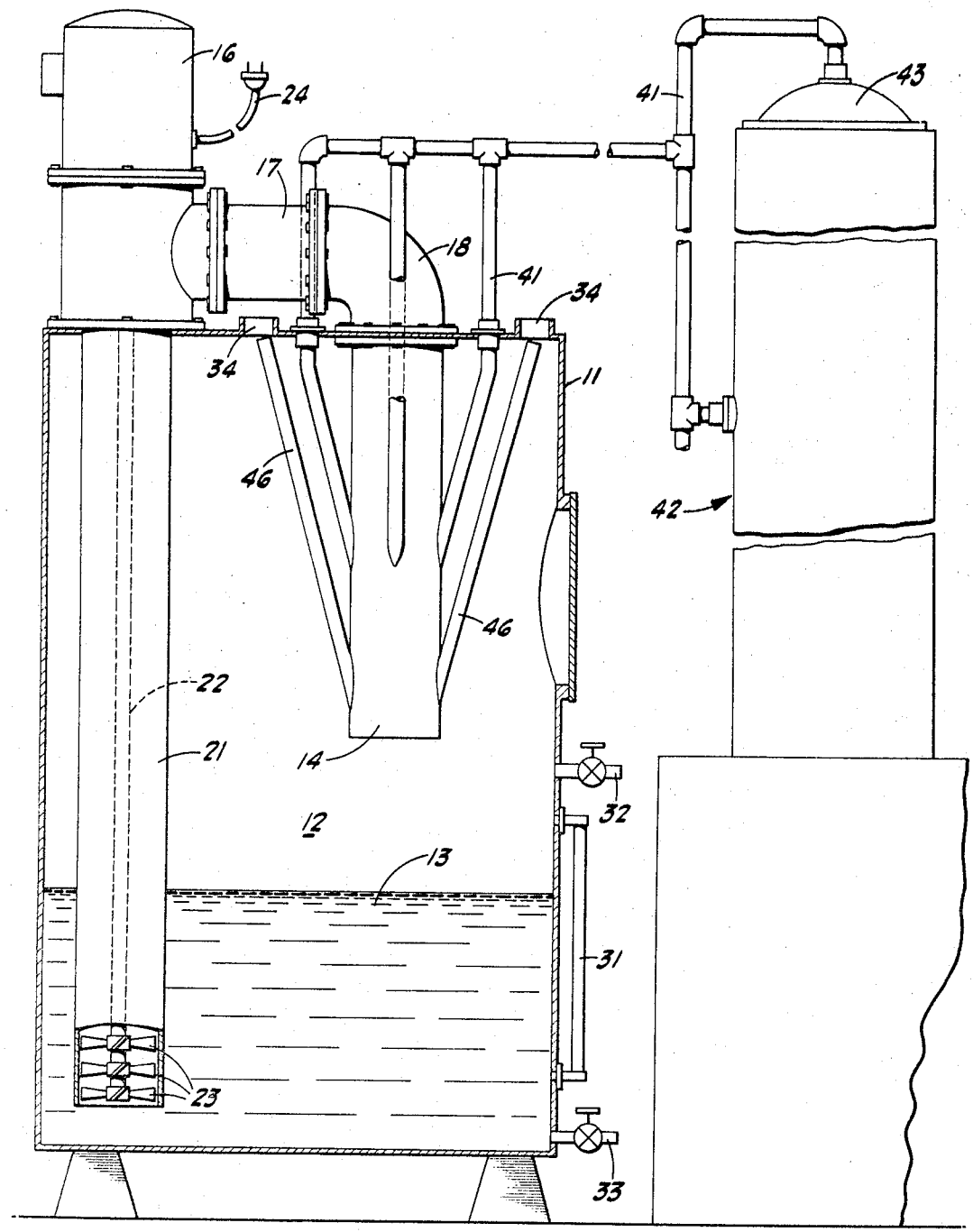
INVENTOR.
ANTHONY M. LAZAROS
BY
Lippincott, Ralls & Hendricson
ATTORNEYS

United States Patent Office 3,442,603
Patented May 6, 1969

3,442,603
**METHOD AND APPARATUS FOR
PURIFYING GASES**
Anthony M. Lazaros, 20 Monroe St.,
San Francisco, Calif. 94108
Filed Oct. 13, 1965, Ser. No. 495,510
Int. Cl. B01d 53/34
U.S. Cl. 23—2                                   9 Claims The present invention relates to method and apparatus for the purification of exhaust from chimneys and stacks for the purpose of preventing air pollultion.

Many heavy industries exhaust large quantities of pollutants into the air, and there have been developed devices, such as electronic precipitators and afterburners for the purpose of reducing the amount of such pollutants released. While many of the prior art devices have proven highly advantageous, it is generally recognized that all such devices serve only to minimize the percentage of particular contaminants in exhaust gases.

Analysis of air pollution from exhaust stacks in industry reveals that in addition to particles entrained in the gases, there are also included a variety of noxious and harmful gases themselves. While the exact composition of exhaust gases varies between industries, at least a large majority contain both entrained particles and harmful combustion products.

The present invention is particularly directed to the substantially complete purification of exhaust gases. The invention is applicable to the removal of particles and also to the changing of chemical compositions of exhaust gases themselves, so that only pure air is ultimately vented in the atmosphere. While the invention is applicable to a wide variety of industries, it is noted to have been successfully operated in the field of petroleum refineries. The invention in general employs a high velocity stream of liquid confined in a conduit that may be oriented in any direction, and at least one inlet pipe connected between an intermediate portion of the conduit and an otherwise closed exhaust stack or combustion chamber. The invention actually establishes a vacuum in the inlet lines to forcibly withdraw exhaust from the stack, and such exhaust is then mixed with the moving liquid in the conduit. The liquid is then passed from the conduit to fall freely into a reservoir so that purified gases may escape therefrom. Particles in the exhaust are mostly retained in the liquid; however, provision is also made for returning to the liquid any particles that may originally escape therefrom. Additionally, the invention operates upon combustion gases so that the end products are either released as purified air or retained in an enclosed chamber of the invention. Analysis of gases leaving the present invention indicates a substantially complete purification of exhaust gases withdrawn from exhaust stacks, and in particular, the most common contaminants are found to be entirely missing.

The invention may be best understood by reference to the accompanying drawing, wherein the single figure is a vertical sectional view of a purification unit in accordance with the present invention and showing the connection thereof to a factory exhaust stack.

Considering now the present invention in some detail and referring to the drawings, it will be seen that there is provided a container or tank 11 defining a chamber 12 within which there is disposed a pool 13 of liquid described in more detail below. Within the chamber 12 there is provided a depending conduit or pipe 14 extending from the top of the chamber downwardly toward but short of the top of the pool 13. Provision is made for circulating the fluid of the pool 13 through the conduit 14, and to this end there may be provided a pump 16 having an outlet line 17 joined by an elbow 18 to the top of the pipe 14. The pump drive may be mounted atop the tank 11 with an elongated depending inlet line 21 extending therefrom into the pool 13. A pump shaft 22 is shown to extend axially of this inlet pipe 21 with a plurality of pump impellers 23 thereon adjacent the bottom end of the pipe but interiorly thereof. Energization of the pump 16, as by an electrical conductor 24 extending to a suitable source of electrical power, then serves to rotate the pump shaft and attached impellers 23, so as to raise liquid of the pool upwardly and to forcibly discharge this liquid from the pump outlet 17, so that it flows downwardly through the liquid conduit 14 and then sprays outwardly from the bottom of this conduit above the top of the pool and returns to the pool.

The tank 11 may be provided with a liquid level indicator, such as a transparent tube 31 communicating with the chamber 12 above and below the intended level of liquid therein. There is also provided a filling valve 32 for inserting liquid into the tank, and a drain valve 33 for draining the tank. At the upper portion of the tank, such as in the top wall thereof, there are provided a number of vent openings 34 through which purified gases may escape from the chamber 12.

In addition to the foregoing components of the present invention, there are also provided inlet or gas lines 41 which are connected to the conduit 14 at a substantial distance from the bottom thereof and which extend upwardly therefrom through a tank wall. These gas lines 41 are connected at their opposite ends to a chimney or exhaust stack 42, which is otherwise closed at the top thereof, as by a cover 43. The gas lines may be connected to the top or sides of the chimney 42, and the only openings for escape of gas in the chimney are comprised by these lines. Within the chamber 12, the gas lines connect to the conduit 14 and communicate with the interior thereof, preferably being inclined downwardly at the point of connection with the conduit. Also within the chamber 12 there are further provided recycling tubes 46 which communicate with the interior of the conduit 14 adjacent the bottom thereof and extend upwardly therefrom into close proximity with the vent openings 34. At least one tube 46 is provided for each vent opening. With the conduit 14 filled with rapidly moving liquid, there will be established somewhat of a Venturi action at the connection of the tubes 46 to the conduit so as to draw a vacuum in these tubes, and consequently to establish a sucking action adjacent the vent openings 34.

With regard to the composition of the liquid employed in the chamber 12, it is noted that such liquid serves the purpose of purifying entrained gases and removing particles from such gases. These functions may be accomplished by comprising the liquid of water with the addition of certain common chemicals. A preferred embodiment of the present invention employs bicarbonate of soda and finely granulated carbon as the chemical additive to water. A practical liquid composition has been employed comprising 400 gallons of water with 10 pounds of bicarbonate of soda and 10 pounds of granulated carbon therein. The size of the carbon grains should be maintained in the order of 40 mesh to 100 mesh. It is, of course, possible to vary the proportions of additives within reasonable limits. It is also possible to employ additional additives, however the above-identified mixture has been found to be highly advantageous in purification of exhaust gases, as from a petroleum refinery.

Considering now the operation of the present invention, it is first noted that the chimney or exhaust stack is to be closed as by the cover 43, so that no direct exhausting of gases to the atmosphere can occur. The gas lines 41 are connected to the chimney or stack 42 in communication with the interior thereof. Following such connections, the tank 11 is filled to the desired level through the filling valve 32, as indicated by the level tube 31. The pump 16 is then energized to rotate the impellers thereof, and draw the liquid upwardly to the top of the tank whereat it is fed into the top of the depending conduit 14, so as to flow downwardly therein. It is to be particularly noted that the rate of liquid flow is to be maintained sufficient to fill the conduit 14 with liquid at all times. The action of the liquid flowing downwardly through the conduit 14 draws a vacuum on the gas lines 41, so that exhaust gases in the chimney or stack 42 are actually sucked into the gas lines, and forcibly removed from the chimney or stack. Gases passing through the lines 41 enter the stream of liquid flowing downwardly in the conduit 14, and are thus entrained therein. These exhaust gases may contain particles of soot or other foreign matter which are likewise entrained in the liquid and remain therein as it flows from the bottom of the conduit 14 and falls into the liquid pool 13. In actual practice, it has been found that a very substantial vacuum in excess of 20 inches of mercury may be established in the gas lines 41.

Not only is the exhaust gas entrained and mixed with the liquid flowing in the conduit 14, but also it is maintained in such liquid for a substantial length of liquid flow to the open bottom end of the conduit. During this time combustion products, and the like, such as carbon monoxide, are acted upon by the bicarbonate of soda and finely granulated particles of carbon in the liquid to chemically change the composition thereof. As the liquid falls from the open bottom of the conduit 14, gases in the liquid escape, and such gases as may actually enter the pool 13 will rise to the surface and escape from the pool. Particles in the exhaust from the stack or chimney 42 remain in the liquid as it enters the pool and slowly settle to the bottom of the pool to collect thereat. Periodically, the liquid is drained through the valve 33 to remove sludges that may thus form at the bottom of the pool. It is, of course, to be appreciated that the tank 11 may be formed with an inclined bottom having the drain valve 33 at the lowermost portion of such incline so as to facilitate drainage of sludges and liquid from the tank.

Purified gases which escape from the liquid falling from the open end of the conduit and from the top of the pool 13 rise in the chamber 12 to leave the chamber by the vent openings 34. As previously noted, the recycling tubes 46 establish a suction adjacent each of the vent openings by virtue of the Venturi action at the lower ends of these tubes, so that any particles that may have randomly escaped from the liquid and been borne upwardly by gas currents toward the vent openings will be drawn back into these tubes 46 and consequently will reenter the liquid stream.

The decontamination or purification process of the present invention is a continuous one, wherein combustion products, or the like, from an exhaust stack or chimney are continuously withdrawn therefrom by the low pressure established in the gas line 41 connected to such stack or chimney. The pump 16 operates continuously to maintain a relatively steady flow of liquid through the conduit 14 in filling relation thereto. Harmful exhaust contaminants are acted upon in the flowing liquid in the tube 14 for reduction thereof to harmless gases, or the like, that may then be safely exhausted from the chamber 12 into the atmosphere through the vent openings 34. Particles of all types that may be removed from the chimney or stack 42 are retained in the tank 11 of the present invention, and are periodically withdrawn therefrom for waste disposal. It will, of course, be appreciated that periodic redraining and refilling of the tank is necessary, although it is possible to automate this operation so that no shutdown of the apparatus is required. Periodic addition of liquid and draining of sludge may be carried out without shutdown so long as an appropriate level of liquid within the tank is maintained.

It is to be noted that the exhaust from the stack or chimney 42 is forcibly withdrawn therefrom and this action of the present invention may be employed to minimize the necessary height of chimneys or exhaust stacks. In actual practice, it has been found that high chimneys or stacks may be capped at the top and the gas lines 42 connected near the bottom of the stack. This has been found to have no adverse effect upon combustion carried out at the bottom of the stack. The present invention thus operates to insure the establishment of the desired draft for combustion, and previous requirements for vertically extended chimneys are thus materially minimized hereby.

The present invention provides a material improvement in the purification and decontamination of exhaust from industrial processing. Not only does the present invention provide for forcibly withdrawing exhaust from a chimney or the like, and intimately mixing of same with a flowing stream of decontaminating liquid, but additionally provides for drawing back into the tank, any particles that may possibly escape from the initial processing. This then insures the venting to atmosphere of only pure air, and, as noted above, precise gas analysis of the vented air fails to provide any indication of the contaminants and pollutants present in the exhaust from the chimney or stack 42.

It is to be appreciated that numerous modifications and variations of the illustrated embodiment of the present invention may be made without departing from the present invention. Thus, the pump 16 may be alternatively located or constituted such as a submersible pump at the bottom of the tank, or a jet pump, rather than one having an elongated drive shaft as illustrated. Also, there are normally provided access openings to the interior of the tank, as shown for example, above the filling valve 32. While the present invention has been illustrated and described in connection with a single preferred embodiment thereof, it is not intended to limit the invention by the precise terms of the description or details of the illustration. Reference is made to the appended claims for a precise delineation of the true scope of this invention.

What is claimed is:

1. A method of decontaminating exhaust gases comprising the steps of continuously passing a decontaminating liquid through an elongated conduit in filling relation thereto while discharging such liquid into a closed chamber for free fall from the conduit, drawing exhaust gases to be decontaminated into said liquid in said conduit by Venturi action of the flowing liquid, whereby particles in said gases are entrained in said liquid and said gases become decontaminated, continually venting the decontaminated gases to the atomsphere, and establishing a suction in the chamber adjacent the place of said venting by Venturi action from the moving liquid in the conduit.

2. A method set forth in claim 1 further comprised by composing said liquid of water with finely granulated carbon particles and bicarbonate of soda mixed therein.

3. The method of claim 2, wherein said carbon particles are in the size range to pass through 40 to 100 mesh.

4. The method of claim 1 further defined by confining the discharging liquid to a closed chamber having vent openings therein, and establishing a suction in the chamber adjacent each vent opening by Venturi action from said moving liquid in the conduit.

5. Apparatus for decontaminating exhaust gases comprising a closed tank defining a chamber for containing a pool of liquid up to a predetermined level, said chamber having at least one vent opening therein above said level, an elongated conduit having an open end disposed in said chamber above said level, means for pumping liquid from the chamber through said conduit in filling relation thereto, at least one exhaust gas inlet pipe joined to said conduit in communicating relationship to the interior thereof in spaced relation to said open conduit end whereby said liquid draws exhaust gases through said pipe for mixture with the liquid, at least one tube having an open end adjacent said vent opening within said chamber and the other end communicating with the interior of said conduit for sucking stray exhaust particles back into the liquid from adjacent the vent opening.

6. A device as set forth in claim 5 further defined by means connecting said inlet pipe to an exhaust gas stack in otherwise closing relation thereto, whereby a vacuum drawn in said pipe by the liquid sucks exhaust gas into the liquid flowing in said conduit.

7. A device as set forth in claim 5 further defined by at least one tube having an open end adjacent said vent opening within said chamber and the other end communicating with the interior of said conduit for sucking stray exhaust particles back into the liquid from the vent opening.

8. A device as set forth in claim 5 further defined by said liquid including a reducing agent for reducing exhaust gases entrained in the liquid.

9. A purifier for exhaust from a stack comprising a closed tank having at least one vent opening above a pool of liquid therein, means for draining said liquid and replenishing said pool, a conduit having an open end above said pool within said chamber, a pump withdrawing liquid from the pool and discharging the liquid into said conduit to establish a stream flowing through the conduit and out the open end thereof to fall back into the pool, and at least one gas line extending upwardly from said conduit and spaced from the open conduit end for drawing a vacuum in said line, said line extending into a capped exhaust stack for drawing exhaust through the line into said stream of liquid in said conduit, said liquid containing and carrying chemically reactive carbon for purifying said exhaust gases.

References Cited

UNITED STATES PATENTS

| | | | |
|---|---|---|---|
| 2,020,850 | 11/1935 | Myhren et al. | 261—76 |
| 2,684,231 | 7/1954 | Pomykala | 23—2 X |
| 2,762,756 | 9/1956 | Kinnaird | 23—271 |
| 2,886,131 | 5/1959 | Conlisk et al. | 23—4 X |
| 3,250,591 | 5/1966 | Bergholm et al. | 23—2 X |

OSCAR R. VERTIZ, *Primary Examiner.*

E. C. THOMAS, *Assistant Examiner.*

U.S. Cl. X.R.

23—284; 55—244; 261—36, 116